United States Patent [19]

La Place et al.

[11] Patent Number: 5,314,076

[45] Date of Patent: May 24, 1994

[54] INSTALLATION FOR THE MIXING OF TWO FLUID PHASES BY MECHANICAL STIRRING, NOTABLY FOR THE TREATMENT OF WATER BY TRANSFER OF OXIDIZING GAS, AND USE OF SUCH AN INSTALLATION

[75] Inventors: Christian La Place, Colombes; Nathalie Martin, Paris; M. Michel Faivre, Acheres, all of France

[73] Assignee: Gie Anjou-Recherche, Maisons Laffitte, France

[21] Appl. No.: 825,944

[22] Filed: Jan. 27, 1992

[30] Foreign Application Priority Data

Feb. 4, 1991 [FR] France .............................. 91 01352

[51] Int. Cl.$^5$ .......................... B01F 3/04; C02F 1/78
[52] U.S. Cl. .................................... 210/205; 210/219; 210/220; 210/760; 261/91; 261/93; 261/36.1; 261/DIG. 42; 366/103; 366/293; 366/307
[58] Field of Search .......... 261/93, 91, 36.1, DIG. 42; 366/103, 104, 293, 294, 295, 296, 302, 307; 210/219, 205, 207, 220, 221.1, 760; 209/169

[56] References Cited

U.S. PATENT DOCUMENTS

| | | | |
|---|---|---|---|
| 1,312,754 | 8/1919 | Rowand | 209/169 |
| 1,342,115 | 6/1920 | Janney | 209/169 |
| 1,402,099 | 1/1922 | Shimmin | 209/169 |
| 1,434,232 | 10/1922 | Sherwood | 209/169 |
| 2,530,814 | 11/1950 | Becze | 261/93 |
| 2,684,233 | 7/1954 | Payne | 261/93 |
| 3,092,678 | 6/1963 | Braun | 261/93 |
| 3,472,815 | 8/1976 | O'Chesky | 209/169 |
| 3,572,661 | 3/1971 | Muller | 261/93 |
| 3,605,975 | 9/1971 | Brimhall | 209/169 |
| 3,625,834 | 12/1971 | Muller | 261/93 |
| 3,643,403 | 2/1972 | Speece | 261/93 |
| 3,827,679 | 8/1974 | Kaelin | 261/93 |
| 3,865,721 | 2/1975 | Kaelin | 261/93 |
| 4,072,613 | 2/1978 | Alig . | |
| 4,197,200 | 4/1980 | Alig . | |
| 4,378,436 | 3/1983 | Heine | 261/93 |
| 4,454,077 | 6/1984 | Litz | 210/219 |
| 4,519,959 | 5/1985 | Takeachi | 261/93 |
| 4,699,740 | 10/1987 | Bollenrath | 261/93 |
| 4,750,994 | 6/1988 | Schreider | 209/169 |
| 4,919,849 | 4/1990 | Litz | 261/93 |
| 5,009,816 | 4/1991 | Weise | 261/93 |
| 5,108,662 | 4/1992 | Litz | 261/93 |

FOREIGN PATENT DOCUMENTS

| | | | |
|---|---|---|---|
| 1139463 | 1/1983 | Canada | 261/93 |
| 0264905 | 10/1987 | European Pat. Off. . | |
| 2045603 | 4/1971 | Fed. Rep. of Germany . | |
| 1062139 | 4/1954 | France . | |
| 2247426 | 5/1975 | France . | |
| 2558818 | 8/1985 | France . | |
| 2614016 | 10/1988 | France . | |
| 15706 | 5/1978 | Japan | 261/93 |
| 1221022 | 2/1971 | United Kingdom | 261/93 |
| 2033772 | 10/1979 | United Kingdom . | |

Primary Examiner—Thomas M. Lithgow
Attorney, Agent, or Firm—Merchant, Gould, Smith, Edell & Welter

[57] ABSTRACT

The disclosure relates to a preferred application for the treatment of stored, waste or filtered water by the transfer of an oxidizing gas into this water. In this case, it has the functions of a turbojet with mass transfer. The installation is constituted by a vessel comprising two concentric parallel chambers communicating with each other at least by their ends, and the central chamber is provided, firstly, at least with two turbines arranged in stages, the rotational axis of which is the same as the axis of symmetry of the installation and, secondly, structures forming counter-blades placed in an alternating position with the turbines.

17 Claims, 3 Drawing Sheets

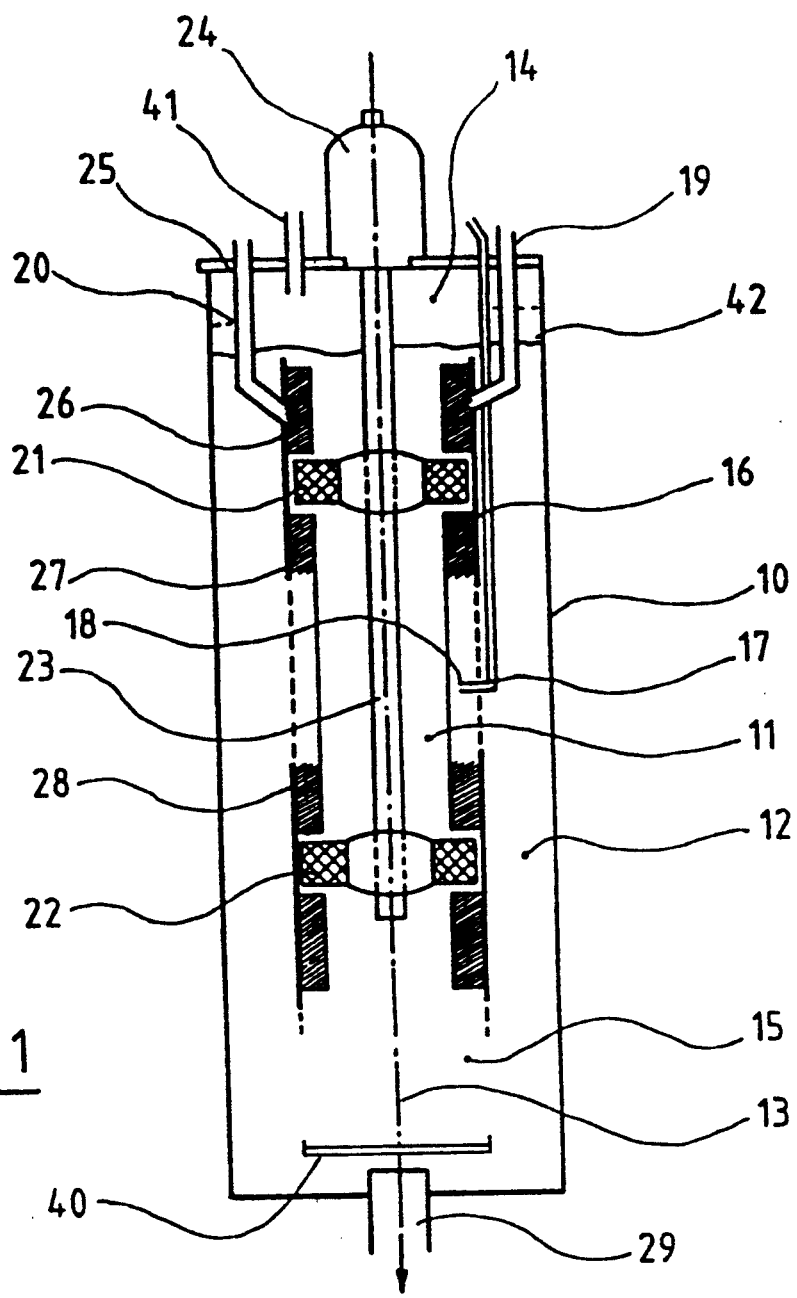
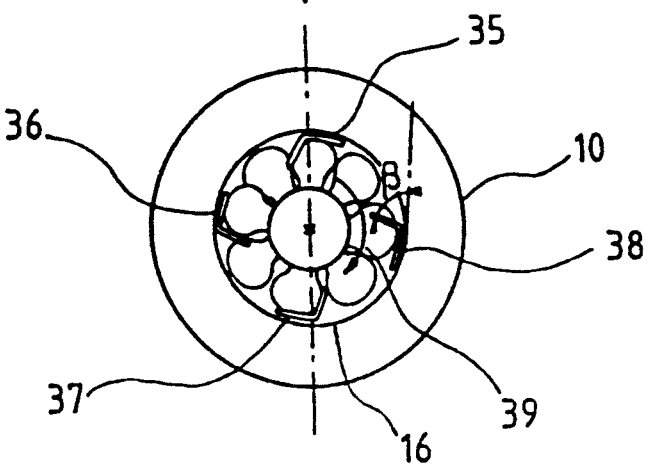
Fig. 1
Fig. 2

INSTALLATION FOR THE MIXING OF TWO FLUID PHASES BY MECHANICAL STIRRING, NOTABLY FOR THE TREATMENT OF WATER BY TRANSFER OF OXIDIZING GAS, AND USE OF SUCH AN INSTALLATION

BACKGROUND OF THE INVENTION

1. Field of the Invention

The field of the invention is that of installations for the mixing of fluids by means of a system for the stirring of the mixture. More particularly, the installation of the invention is designed for the mixing of a liquid phase with a gas phase, enabling the contact between the two phases to be optimized.

The invention is applicable preferably to the treatment of stored, waste or filtered water by the transfer of an oxidizing gas into this water. In this case, it displays the functions of a turbojet with mass transfer.

However, those skilled in the art could envisage its use for the treatment of other liquids or, again, for other mixtures of liquids.

2. Description of the Prior Art

The following are the main aims, in the light of prevailing standards, in the treatment of water with a view to the distribution of water for consumption:
- the elimination of suspended matter;
- the elimination of organic matter;
- the elimination of troublesome ions;
- sterilization.

The standard treatment system most frequently comprises a succession of physical/chemical steps of the coagulation-flocculation-decantation-filtration type.

After the filtration operation, it is known that water should then be rid of pathogenic micro-organisms by means of oxidizing agents (ozone, chlorine etc.) or radiation (UV radiation) or again by a refining treatment using active coal in granular or powder form (the elimination of micropollutants, heavy trace metals, and unwholesome flavors or odors).

The use of ozone is recognized as being efficient not only in bactericidal and virulicidal conditions, but also in combined steps of treatment by ozonation-coagulation, ozonation-flottation, ozonation-adsorption on filtering media (with the possibility of biological activity on the filter), without overlooking the more standard applications such as iron extraction and demanganizing or the elimination of flavors and odors. Finally, it is known that ozone has an oxidizing effect on a number of micropollutants (phenols, certain detergents etc.): see B. Langlais, *Nouveau developpement de l'ozonation en eau potable et technologie appropriee* (New Development of Ozonation in Potable Water and Appropriate Technology) in L'eau, l'industrie, les nuisances (Water, Industry, Nuisance), No. 109, April 1987, pp. 28 to 30.

There are several known types of mixers used in water treatment systems. These mixers may be constituted by injection systems (porous membranes, depression-creating diffusers, emulsifying machines also known as liquid jet vacuum pumps or hydro-injectors), static mixers or dynamic mixers (for example with driven turbine or stirrers).

These known mixers are generally located upstream from the contact vessels (also known as contactors) designed as to keep the oxidizing gas in contact, for a predetermined time, with the flow of liquid to be treated.

Thus, for example, the French patent application No. 90 06969 dated May 31, 1990, filed on behalf of the present applicant, describes an installation comprising, for example, successively a transfer machine for the addition of the treatment gas to the liquid to be treated, a module for the enforced dissolving of the treatment gas in the liquid and a contactor module. The enforced dissolving module described in this document is constituted by a recirculator device constituted by a vessel comprising a first central chamber forming a gas exhaust conduit and a second annular recirculation chamber coaxial to the exhaust conduit. The two chambers are separated by a wall and communicate with each other at their lower and upper parts so as to enable the recirculation of the treatment medium by cyclical passage from one to the other.

SUMMARY OF THE INVENTION

An aim of the present invention is to provide a recirculator device that is not only novel but also improved as compared with the device of this prior art document, so as to increase the efficiency of the enforced dissolving of the treatment gas in the liquid to be treated.

Another aim of the invention is to provide an installation such as this comprising integrated and optimized means for the injection of the treatment gas into the mixture.

An additional aim of the invention is to provide an installation such as this that improves not only the dissolving of the treatment gas in the liquid, but also diminishes the contact time needed for the transfer of mass between the two phases.

Another aim of the invention is to provide an installation such as this that can be located upstream from the contactors, or again plays the role of a complementary mixer after a first contact vessel where the residual ozone content might be too low and might require a reinjection of ozone, for example by the dispersal of the gas cloud coming from this first vessel.

A further aim of the invention is to provide an installation such as this that provides for proper control over the efficiency of transfer of treatment gas to the liquid phase, with great flexibility of regulation due not only to the numerous possibilities of the sizing of the constituent elements of the installation but also, in certain variants, of the possible parametrization of the conditions of operation for a given installation.

These aims, as well as others that shall appear hereinafter, are achieved according to the invention by means of an installation for the mixing of two fluid phases, notably the mixing of a treatment fluid with a fluid to be treated, said mixing installation being constituted by a vessel comprising two concentric parallel chambers communicating with each other at least by their ends, the central chamber being provided:
- firstly, at least with two turbines arranged in stages, the rotational axis of which is the same as the axis of symmetry of the installation; and
- secondly, with structures forming counter-blades placed in an alternating position with the turbines.

By means of a structure such as this, a high efficiency of transfer is noted, especially when the treatment fluid is a gas, and the fluid to be treated is a liquid. The efficiency is in all likelihood a result of the improvement of the gas/water contact resulting from the dynamic mixing, from a probable shearing of the gas bubbles by the turbines and/or from the sustaining of the dynamics of recirculation by the motor drive effect of the turbines.

Advantageously, at least one of said chambers has a shape with a symmetry of revolution, notably a cylindrical or biconical shape.

In a preferred characteristic of the invention, at least one of said turbines has blades formed by perforated sheets. In this case, said blades and/or said counter-blades are preferably formed out of a sheet of expanded metal, so as to present an appearance of a grating, the orientation of its straps giving it a transparency that is variable according to the incidence of the flow.

Advantageously, the counter-blades are constituted by elements of plates fixed to the wall of the central chamber according to a symmetrical distribution, so as to counter the rotation of the fluid induced by the turbines. Said plate elements are preferably oriented in the opposite direction to that of the rotation of the turbines, by an angle of about 60° with respect to the tangent to the wall of the chamber.

According to another embodiment, the counter-blades are mounted in a hinged position in said chamber, so as to be either folded back in the telescoped position or locked in the projecting operational position.

In an advantageous embodiment of the invention, the installation has at least one point for the injection of the treatment fluid, located between the turbines. If necessary, it has a plurality of injection points for the treatment fluid, arranged in stages along the axis of the installation, the distribution of the injection of oxidizing gas being done as a function of the stages in which the injection points are arranged.

In either case, the injection points cooperate with injection means belonging to the group comprising porous membranes, venturi diffusers, static mixers or other elements.

In a preferred arrangement, said vessel is positioned in a substantially vertical position, and said turbines induce a circulation of the fluid mixture from top to bottom in the central chamber. In this case, it is possible to provide for means for the intake of the fluid to be treated in the upper part of said central chamber. It is also possible to make an outlet for the discharge of the mixture at the bottom of the vessel, and to place a baffle plate mounted in the vicinity of said outlet so as to further the recirculation, in the vessel, of the thin streams of fluid containing bubbles.

It would also be possible to generate a bottom to top circulation in the central chamber; however, in this case, the installation should clearly be adapted to enable the recirculation of the totality of the mixture from top to bottom in the external chamber, especially if the mixture includes a gas phase.

Depending on different variants of use of the installation according to the invention, it could be seen to it that:
said fluid mixture is placed under pressure in the vessel, the treatment fluid being introduced by means of a pressure-reducing device such as a hydro-injector or a liquid jet vacuum pump and/or a compression device such as a pump, compressor or water ring pump;
said vessel is at least partially immersed in a reservoir of liquid to be treated, so as to subject it, continuously or cyclically, to a partial treatment;
at least two vessels according to the invention are associated so as to work in parallel or in series.

BRIEF DESCRIPTION OF THE DRAWINGS

Other features and advantages of the invention shall appear from the following description of preferred embodiments of the invention, given by way of a non-restrictive illustration, and from the appended drawings of which:

FIG. 1 is a vertical sectional view of an advantageous embodiment of the installation according to the invention;

FIG. 2 is a horizontal sectional view of the installation of FIG. 1;

DETAILED DESCRIPTION OF THE INVENTION

Figure 3:
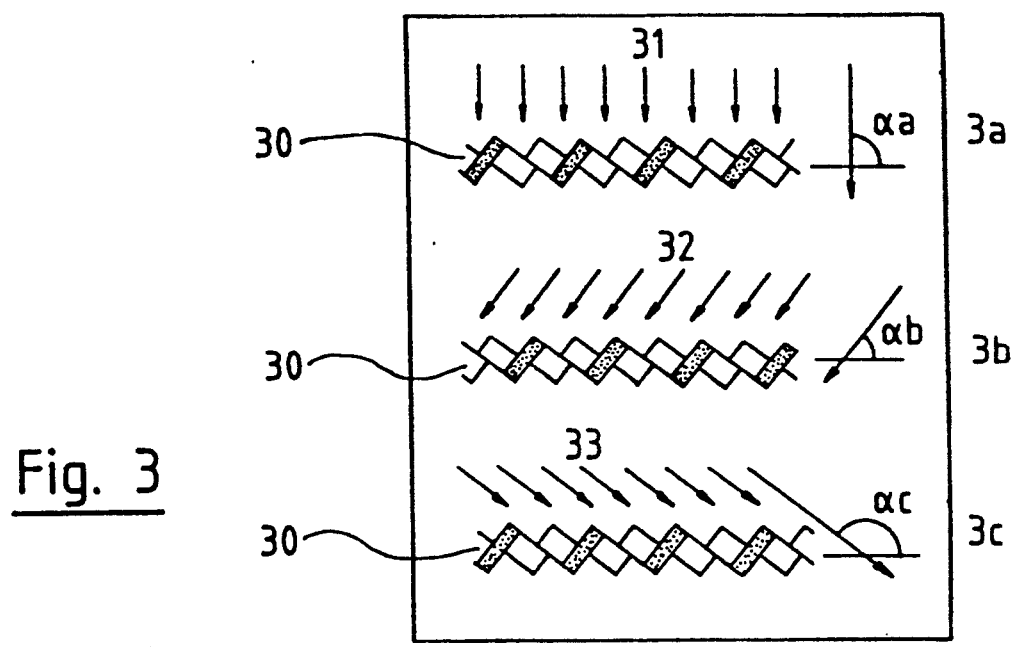
FIGS. 3A, 3B, 3C illustrate the effect of transparency variable with the flow, given by the blades of turbines made of expanded metal according to the invention, as a function of the angle of incidence.

The device of FIG. 1 is more especially designed for the putting of liquids into contact, and notably for the placing of potable water and waste water in contact with a treatment gas.

It can be used in many fields where it is necessary to provide for intimate contact between a liquid phase and a gas phase, if necessary with a predetermined minimum period of contact. For example, we may cite notably the operations for disinfection, oxidizing, de-odorizing or de-coloring of water. Other applications will also be seen easily by those skilled in the art. These applications relate especially to the treatment of waste water in urban conditions, in the agro-alimentary, pharmaceutical and chemical industries, etc. and also in many industrial manufacturing processes.

Conversely, other variants of the invention may be designed so as to enable the treatment of a fluid by another fluid, or again of a gas by a transfer liquid such as, notably, $H_2S$, $NH_3$, $SO_2$+water, . . . .

In the example shown in FIG. 1, the installation is constituted by a vessel 10 comprising two concentric chambers:
A first central chamber 11, forming an exhaust conduit;
a second annular peripheral chamber 12, extending coaxially and in parallel to the central chamber 11.

The longitudinal axis 13 of the vessel extends vertically.

The two chambers 11 and 12 communicate with the two ends of the vessel, by the upper communication zone 14 and the lower communication zone 15.

If necessary, the communication apertures are also made in the wall 16 separating the two chambers 11, 12 at levels chosen as a function of the desired dynamic flow of the fluids.

In the embodiment shown, and as can be seen in FIG. 2, the vessel 10, as well as the separation wall 16, are cylindrical in shape. Other shapes can be envisaged, notably a biconical shape, wherein the portion of this shape having the minimum diameter would be substantially at mid-height of the vessel (preferably in the central conduit), so as to create a vortex effect for the flow of the fluids. A similar effect could also be obtained by adding an internal annular projecting shape (such as a diaphragm) between the turbines and the chamber.

The central chamber 11 houses two turbines 21, 22 driven rotationally by a shaft 23 with an axis 13. A motor-reduction gear 24 is attached to a lid 25 for closing the vessel 10 to drive the shaft 23 and the turbines 21, 22 rotationally.

Advantageously, the turbines have blades or vanes with a profile capable of generating a phenomenon of pumping of the fluid present in the central conduit 11. The blades are, for example, eight or twelve in number, but any other appropriate value may also be used depending on the desired configuration.

According to an advantageous characteristic of the invention, the blades are advantageously perforated. This can be done, for example, by forming the blades of the turbines out of sheets of expanded metal, so that they have an appearance of a grating.

This operation generally consists in making regular notches in a metal sheet, and then in drawing the notched sheet, possibly with a specific shaping operation, so as to make regular apertures in the metal sheet, the edges of which take a predetermined orientation and shape.

This characteristic gives the blades a transparency that is variable according to the incidence of the fluid stream going through the central chamber 11.

This phenomenon of variable transparency is illustrated in FIG. 3. For a given arrangement of the perforated blade 30, shown herein in a plane profile, for reasons of simplification, there are shown three incidences of flow corresponding to three distinct values of transparency:

- in FIG. 3A, the angle $\alpha_a$ of incidence is perpendicular to the plane of the blades made of expanded metal, which puts up a partial frontal transparency against the flow 31;
- in FIG. 3B, the incidence $\alpha_b$ of the flow 32 is oriented according to a direction for which the blades offer a maximum transparency;
- in FIG. 3C, on the contrary, the angle of incidence $\alpha_c$ corresponds to a concealing of the flow in the direction considered.

Through this configuration of the turbine blades, several advantages are combined. The coalescence of dissolved gas on the blades is avoided. Under certain conditions, a splitting of the bubbles is prompted by the intense shearing effect at all the leading edges of the perforated sheets. Intense breaks are caused in the liquid streams, notably in furthering the formation of whirlpools within which the gas bubbles are retained and gradually dissolved in the liquid. Other effects resulting from the configuration are likely to occur and are the source of the observed efficiency of the device.

In more sophisticated embodiments, it is possible to make each blade by the overlapping of several sheets of expanded metal having identical or different degrees of "transparency", or any other configuration that can be used to increase the effect of the installation.

Advantageously, the turbines 21, 22 work in cooperation with counter-blades 26, 27, 28 attached to the internal face of the partition 16 separating the chambers 11, 12. These counter-blades 26, 27, 28 are interposed between the turbines 21, 22 so as to have an effect upstream and downstream from the rotary blades of the turbines 21, 22.

As shown in FIG. 2, these counter-blades are advantageously formed by portions of plates 35, 36, 37, 38, distributed symmetrically about the axis 13 of the installation and folded so as to have a part projecting towards the interior of the chamber 11. Advantageously, the projecting part of the plates forming a counter-blade have an angle $\beta$ with a value ranging from 45° to 90°, advantageously 60° with respect to the tangent to the wall.

These counter-blades are also oriented in the opposite direction to the direction of rotation 39 of the turbines 21, 22. The result thereof is an increased effect of shearing of the liquid streams and of splitting up of the bubbles. This arrangement furthermore prevents the coalescence of the gas in prompting whirlpools that prevent the formation of gas pockets on or between the turbines.

The counter-blades are preferably four in number, but any other number and configuration leading to a similar result does not go beyond the scope of the present invention.

In an advantageous alternative embodiment, not shown, the counter-blades are mounted in a hinged way on the wall of the central chamber 11. In this way, they may change between two positions:

- a telescoped position, in which the counter-blades are folded along the wall so as to leave the passage free, for example to enable the positioning or removal of the turbines 21, 22;
- an unfolded position in which the counter-blades are locked, during the operation of the system in normal mode.

Advantageously, the counter-blades are perforated, for example in being made of sheets of expanded metal.

Preferably, the direction of rotation 39 of the turbines is designed so as to prompt a circulation of the treatment mixture from top to bottom in the central conduit 11, and from bottom to top in the peripheral annular chamber 12.

However, a reverse direction of circulation is not ruled out in certain applications.

The turbines are advantageously driven at the same rotation speed. However it is possible, at the cost of a more complex driving device, to envisage distinct rotation speeds as a function of the effects sought.

The central conduit 11 includes means 17 for the injection of the treatment gas. The injection point 18 of the gases is advantageously located substantially midway between the two turbines 21, 22 and are, at any rate, localized at the position where the linear speed of the fluid streams is at its greatest, i.e. generally in the vicinity of the periphery of the chamber. The distance of the turbines from each other and the localization of the point of injection 18 have to be determined as a function of the expected performance characteristics, the general configuration of the installation, the rotation speed of the turbines, the circulation speed of the treatment mixture.

As the case may be, it is possible to provide for a distribution of the injection points on the entire circular peripheral contour of the wall 16 or on a part of it, at the same level.

In another variant, it is possible to arrange the injection points in stages on distinct levels, along the central conduit 11. In this case, it is then possible to modulate the rate of treatment gas injected as a function of the height of each injection point in the conduit: the highest injection points, hence those that are furthest upstream in the flow, then advantageously give more treatment gas than the points located downstream in the flow.

The quantity of gas introduced depends on a large number of parameters which will be adjusted by those skilled in the art.

For example, the parameters that may be cited include the final concentration desired, the treatment rate and time sought. The flowrate of gas introduced, the air/water ratio, and the concentration in oxidizing gas in the gas introduced will then be adapted, notably as a function of the speed of rotation of the turbines, the speed of circulation of the flow in the device, the swirling character of the flow, the rate of transfer obtained etc.

The installation also includes pipes 19, 20 for the intake of liquid to be treated in the central chamber. This intake is advantageously done in the upper part of the central chamber, at the level of the counter-blades 26.

The pipes 19, 20 are two or more in number, preferably distributed symmetrically about the axis 13. Instead of these pipes, it is also possible to envisage an intake of treatment liquid by any other means, for example by means of an annular by-channel (not shown).

In the lower part of the installation, there is made a hole 29 for the discharge of the treatment mixture. In the vicinity of the discharge hole 29, there is placed a baffle plate 40 that promotes the recirculation of streams of treatment mixture in the vessel 10, before their removal. This plate 40 is also designed to reorient the circulation of the bubbles of unexhausted treatment gas inside the vessel.

One or more vents 41 may be made in the upper part of the vessel 10.

In the case of the treatment of water, the gas used is advantageously ozone. It is generally introduced in a predetermined concentration in a gas mixture with air.

In another embodiment, the treatment fluid may be also ozone dissolved in $H_2O_2$ or any other oxidizing or non-oxidizing pump fluid. In this case, the pump fluid is used for the prior dissolution of the ozone (or of another treatment gas) located upstream with respect to the pipe 17.

In other applications, the treatment fluid may be different. For example, it is possible to introduce oxygen, chlorine, carbon dioxide or, again, sulphur dioxide, into other types of water-treatment installations.

It is also possible, notably for the treatment of water charged with organic materials, to envisage the parallel injection of determined doses of chemical reagents and/or absorbents such as active carbon.

As a rule, the nature of the device for injecting treatment fluid is not a characteristic that limits the scope of the invention. It is possible, as the case may be, to use porous membranes, diaphragm diffusers or venturi diffusers, or any other appropriate apparatus known to those skilled in the art.

The quantities and flowrates of the treatment medium are advantageously stabilized so as to obtain a predetermined stable level 42 in the vessel. This level 42 is chosen so that it is neither unduly high nor unduly low, so as to minimize the effect of degassing the system during the passage from the annular chamber 12 to the central chamber 11. The paths of the bubbles should indeed, to the extent possible, avoid intersecting the surface 42.

In the same way, it is necessary to optimize the air/water ratio, in relation with the speed of rotation of the turbines. If too much gas is introduced into the installation, a congestion of air will be observed in the turbines, and the gas bubbles will then be too big to be split. They will form pockets and will be difficult to dissolve in the treatment medium. Conversely, the injection of an insufficient quantity of gas gives but poor efficiency for the treatment of the water.

Tests have been made on a reduced scale model of an installation such as the one shown in FIG. 1. The vessel 10 has a height of about 160 cm for a diameter of about 30 cm.

The wall 16 separating the two chambers 11, 12 extend over a height of 100 cm, starting at 40 cm above the bottom of the vessel. The two turbines, having twelve blades each, were respectively located at about 40 cm and 85 cm from the bottom of the partition 16. The injection of ozone was done about 15 cm above the lower turbine.

The internal diameter of the central chamber was about 19 cm, and the overall diameter of the turbines was 18 cm.

The experimental conditions entailed the treatment of 8 $m^3$ of water per hour. After an average period of stay of 42 seconds, it was observed that a rate of treatment of 1.2 mg/l left a residual content of 0.9 mg/l in the treatment medium for an air/water ratio of about 3.5%. This corresponds to transfer effiency close to 90%.

Figure 4:
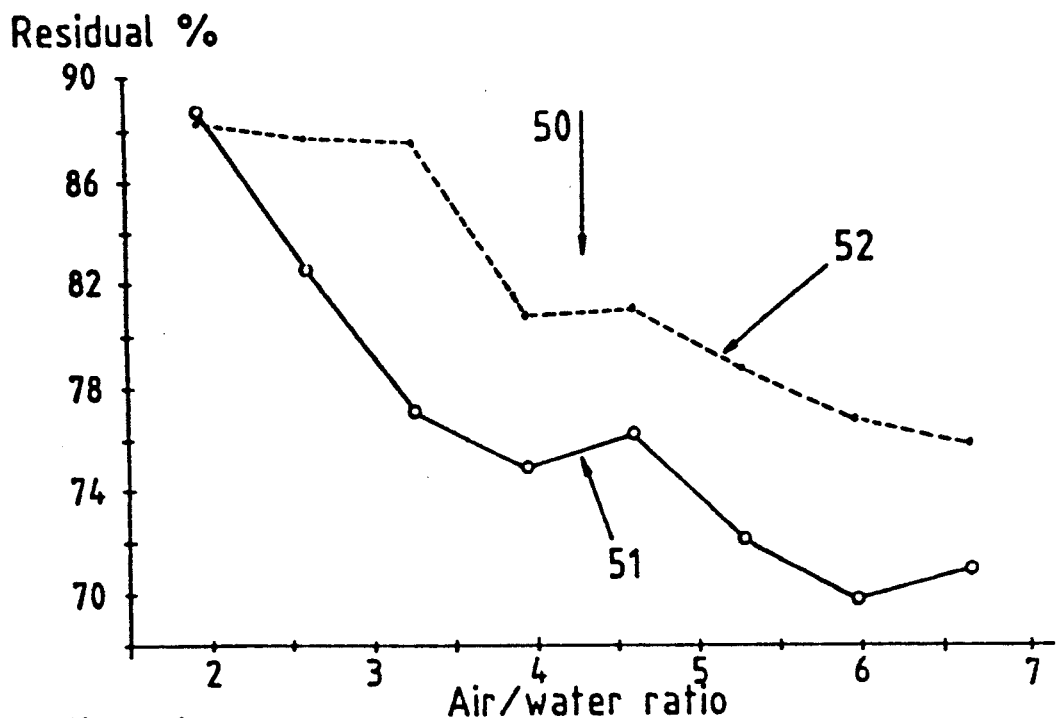
FIG. 4 is a curve representing the influence of the air/water ratio on the residual percentage of ozone, obtained in a prototype of an installation according to the invention.
Figure 5:
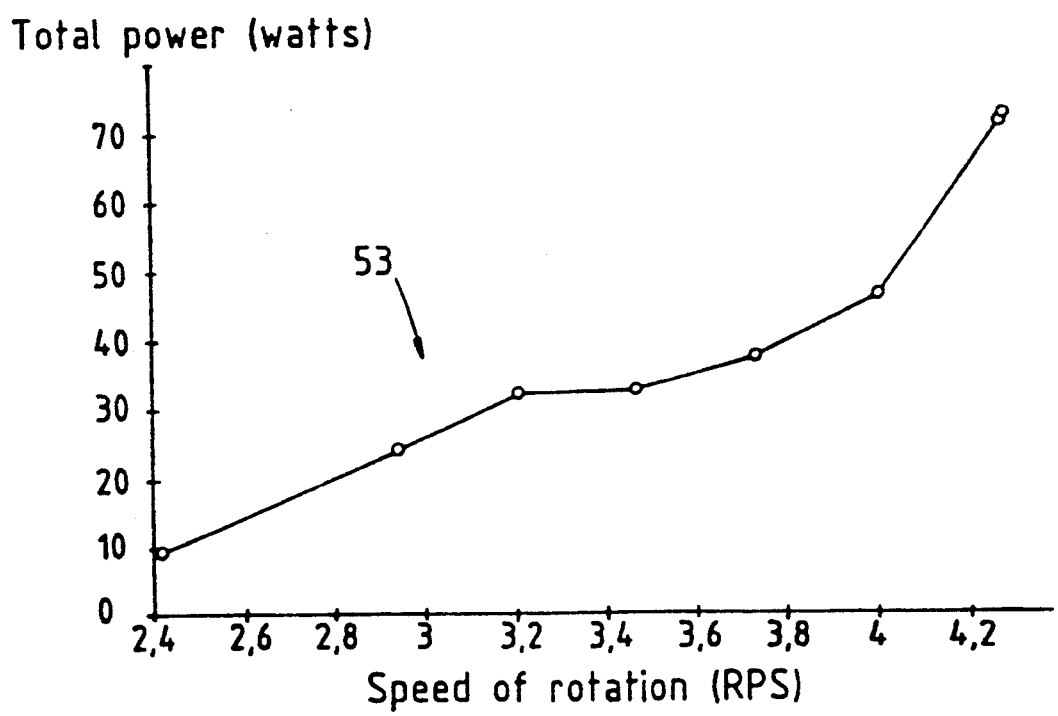
FIG. 5 is a curve representing the variation of the power consumed to drive the turbines rotationally, as a function of the speed of the turbines, in a prototype of an installation according to the invention.

When this device was put into operation, promising phenomena in the form of levels were observed, notably in the following two curves:
the curve of the influence of the air/water ratio on the residual percentage of dissolved ozone in relation to injected ozone (FIG. 4),
the total power of rotational driving of the turbines as a function of the speed of rotation of the turbines (FIG. 5).

More precisely, a level 50 is observed, for a value of the air/water ratio of 3% to 5% (in volume), in the region of 76% of dissolved gas in relation to the injected gas (curve 51). The curve 52, corresponding to the efficiency of transfer, shows a level for the same values of the air/water ratio.

Secondly, the curve 53 of FIG. 5 shows a level for rotation speeds of 3.1 to 3.8 rps with respect to the total power consumed for the rotational driving of the turbines (in the region of 30–40 watts). Below these rotation speeds, a pulsation phenomena is observed wherein air pockets form beneath the turbines owing to their insufficient rotation speed, and then escape periodically beyond a certain volume of the pocket.

Studies made have shown that the installation provides a high energy gain in relation to existing installations from the viewpoint of the necessary power (for the rotational driving of the turbines) to obtain a given gain in ozone dissolution (4 watts.hour/$m^3$ to dissolve one gram of ozone in the prototype made).

Furthermore, it has also been observed that the efficiency of transfer corresponding to the passage of the fluid to be treated in the installation of the invention is appreciably higher than that obtained in standard installations with equivalent volumes and flowrates.

The installation of the invention may be used in different configurations.

For example, it is possible to put the treatment mixture contained in the vessel under pressure so as to further increase the efficiency of the transfer of the treatment gas. This gas is then advantageously introduced in the form of a water+gas emulsion by means of hydro-injectors, or by means of static mixers, or in single-phase gas form by means of a water ring compressor or equivalent device.

The installation of the invention can also be used to carry out a reenriching of the treated water, after the contactor of an existing treatment system.

Several installations can be used in parallel to treat high flowrates.

Figure 6:
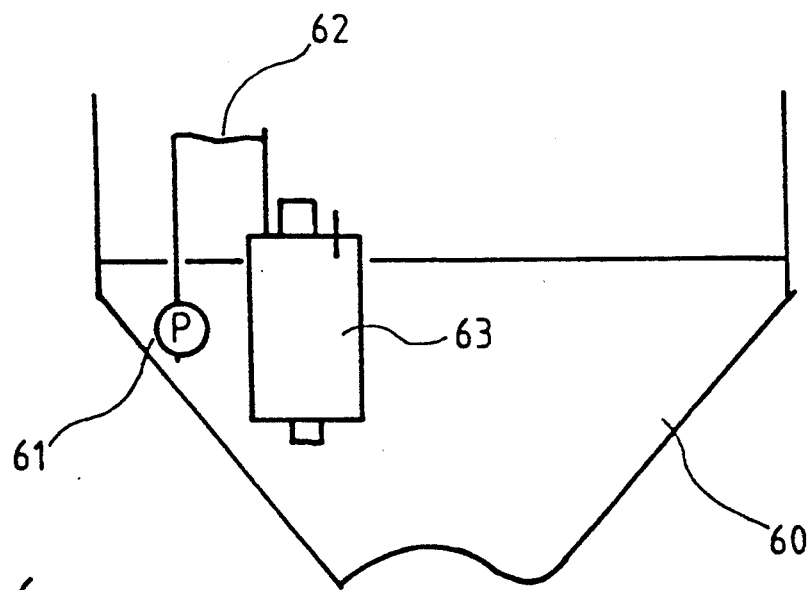
FIG. 6 gives a schematic view of an installation according to the invention in partial immersion in a reservoir for the storage of potable water.

In the embodiment shown in FIG. 6, the installation is immersed at least partially in a water storage reservoir. The stored water 60 is at least partially recycled through a pump 61 and an intake pipe 62 in the installation 63 according to the invention. This enables the partial regeneration of the stored water. The immersion of the installation further makes it possible to reduce the bulk.

What is claimed is:

1. An installation for the mixing of a liquid, such as stored water, waste water and/or filtered water, with a treatment gas, wherein:
   (a) said mixing installation comprises a vessel having an axis of symmetry and said installation further including means defining an inner concentric central chamber having an open top and open bottom within said vessel and fluid flow communication with said vessel through said open top and open bottom, and defining a peripheral chamber outside of said central chamber means and inside said vessel and a central chamber inside of said central chamber means, wherein the central chamber is provided with:
      (i) at least two turbines rotatably mounted one above the other, the rotational axis of which is said axis of symmetry of the vessel;
      (ii) counter-blades comprising plates fixed to an inner wall of the central chamber means according to a symmetrical distribution, so as to counter rotation of fluid induced by blades of the turbines, said counter-blades being placed in an axially alternating position with the turbines; said blades and said counter-blades comprising gratings of expanded metal having straps which give the blades and the counter-blades a transparency that is variable according to the incidence of the flow, of the liquid, during operation; and
      (iii) means to add a treatment gas to the central chamber for mixing therein with the liquid.

2. An installation according to claim 1, wherein at least of one of said central chamber means or vessel has a cylindrical shape, with a symmetry of revolution.

3. An installation according to claim 1, wherein said plates are preferably oriented in the opposite direction to that of the rotation of the turbines, by an angle of about 60° with respect to a tangent to the wall of the chamber.

4. An installation according to claim 1, wherein the counter-blades are mounted in a articulated position in said chamber, so as to selectively be either folded back in a telescoped position or locked in a projecting operational position.

5. An installation according to claim 1, wherein said means to add a treatment gas is located between the turbines.

6. An installation according to claim 5, wherein said means to add a treatment gas comprises a porous membrane arrangement.

7. An installation according to claim 5 wherein said means to add a treatment gas comprises a venturi diffuser.

8. An installation according to claim 5 wherein said means to add a treatment gas comprises a static mixer.

9. An installation according to claim 1, wherein said means to add a treatment gas comprises a plurality of injection points for the treatment gas, arranged in stages along an axis of the installation, a distribution of the injection of treatment gas being a function of the stages in which the injection points are arranged.

10. An installation according to claim 1, wherein said vessel is positioned in a substantially vertical position, and wherein said turbines induce a circulation of the fluid mixture from top to bottom in the central chamber means.

11. An installation according to claim 10, comprising means for intake of the fluid to be treated in the upper part of said central chamber means.

12. An installation according to claim 10, including an outlet for discharge of the mixture at the bottom of the vessel, and wherein a baffle plate is mounted in a vicinity of said outlet so as to further recirculation, in the vessel, of thin streams of fluid containing bubbles.

13. An installation according to claim 1, comprising at least two vessels working in parallel.

14. An installation according to claim 1 wherein said means to add said treatment gas comprises a hydro-injection.

15. An installation according to claim 1 wherein said means to add said treatment gas includes a liquid jet vacuum pump.

16. An installation according to claim 1 wherein said means to add a treatment gas comprises a water ring compressor.

17. An installation according to claim 1 including compressor means for adding said treatment gas to said vessel under pressure.

* * * * *